United States Patent
Fuehrer (10) Patent No.: US 11,648,842 B2
(45) Date of Patent: May 16, 2023

(54) PLUG CONNECTOR PART HAVING A SENSOR DEVICE ARRANGED ON CONTACT LAMELLAE OF A CONTACT ELEMENT

(71) Applicant: PHOENIX CONTACT E-Mobility GmbH, Schieder-Schwalenberg (DE)

(72) Inventor: Thomas Fuehrer, Blomberg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 17/612,233

(22) PCT Filed: May 6, 2020

(86) PCT No.: PCT/EP2020/062496
§ 371 (c)(1),
(2) Date: Nov. 18, 2021

(87) PCT Pub. No.: WO2020/233986
PCT Pub. Date: Nov. 26, 2020

(65) Prior Publication Data
US 2022/0250490 A1    Aug. 11, 2022

(30) Foreign Application Priority Data

May 22, 2019 (DE) ...................... 10 2019 113 591.5

(51) Int. Cl.
*H01R 13/66* (2006.01)
*H01R 13/11* (2006.01)
(Continued)

(52) U.S. Cl.
CPC .............. *B60L 53/16* (2019.02); *H01R 13/11* (2013.01); *H01R 13/18* (2013.01);
(Continued)

(58) Field of Classification Search
CPC ......... B60L 53/16; H01R 13/11; H01R 13/18; H01R 13/111; H01R 13/6683; H01R 27/02; H01R 24/76; H01R 2201/26; G01K 1/16
(Continued)

(56) References Cited

U.S. PATENT DOCUMENTS

| 2019/0006796 A1 | 1/2019 | Troeger et al. |
| 2019/0036278 A1 | 1/2019 | Shimizu et al. |
| 2020/0381874 A1 | 12/2020 | Rose et al. |

FOREIGN PATENT DOCUMENTS

| DE | 102015115657 B3 | 2/2017 |
| DE | 102016001572 A1 | 8/2017 |

(Continued)

*Primary Examiner* — Alexander Gilman
(74) *Attorney, Agent, or Firm* — Leydig, Voit & Mayer, Ltd.

(57) ABSTRACT

A plug connector part for charging an electrically-operated vehicle is provided. The plug connector part includes at least one electrical contact element which is connectable along an insertion direction to a counter-contact element of a counter-plug connector part and has a plurality of contact lamellae grouped around a plug opening for receiving the counter-contact element. The plug connector part also includes a spring element arranged at the contact lamellae circumferentially around the insertion direction, at least in portions, in order to provide a mechanical pre-tensing. Further, a sensor device is configured to detect a measurement variable and is arranged at least at one of the contact lamellae and is held by the spring element at the at least one of the contact lamellae.

14 Claims, 5 Drawing Sheets

(51) Int. Cl.
  *H01R 27/02*   (2006.01)
  *B60L 53/16*   (2019.01)
  *H01R 13/18*   (2006.01)
(52) U.S. Cl.
  CPC ......... *H01R 13/6683* (2013.01); *H01R 27/02* (2013.01); *H01R 2201/26* (2013.01)
(58) Field of Classification Search
  USPC ........................................................ 439/620
  See application file for complete search history.

(56) References Cited

FOREIGN PATENT DOCUMENTS

| | | | |
|---|---|---|---|
| DE | 202016106663 | U1 | 3/2018 |
| JP | 2018156896 | A | 10/2018 |
| WO | 0213330 | A1 | 2/2002 |
| WO | 2018197247 | A1 | 11/2018 |

PLUG CONNECTOR PART HAVING A SENSOR DEVICE ARRANGED ON CONTACT LAMELLAE OF A CONTACT ELEMENT

CROSS-REFERENCE TO PRIOR APPLICATIONS

This application is a U.S. National Phase application under 35 U.S.C. § 371 of International Application No. PCT/EP2020/062496, filed on May 6, 2020, and claims benefit to German Patent Application No. DE 10 2019 113 591.5, filed on May 22, 2019. The International Application was published in German on Nov. 26, 2020 as WO 2020/233986 under PCT Article 21(2).

FIELD

The invention relates to a plug connector part for charging an electrically-operated vehicle.

BACKGROUND

Such a plug connector part may, for example, be designed as a charging plug for charging an electric vehicle and, for example, be arranged on a charging cable connected to a charging station. However, such a plug connector part may also realize a charging socket—for example, on the side of an electric vehicle.

Such a plug connector part comprises at least one electrical contact element which may be connected along an insertion direction to a counter-contact element of a counter-plug connector part and has a plurality of contact lamellae, grouped around a plug opening, for receiving the counter-contact element. Arranged on the contact lamellae is a spring element which surrounds the contact lamellae circumferentially around the plug direction, at least in portions, in order to provide a mechanical pre-tensioning, and which spring element is also referred to as an overspring.

The contact element is, for example, connected to a load line and, if the connection is established, serves, for example, for transmitting a load current between the plug connector part and an associated counter-plug connector part. Because, in the course of a charging process for charging an electric vehicle, charging currents with high amperage, e.g., 500 A or even higher, may flow, heating may occur in the charging system during a charging process—in particular, also at the plug connector part.

Heating may also hereby occur, in particular, in the region of contact elements of the plug connector part. Fouling or damage at contact elements may lead to an increase in the electrical resistance, and thus to a greater heat loss during operation, which should be detected in the course of temperature monitoring of the connector part in order to prevent, if possible, damage to the plug connector part due to excessive heating.

Temperature monitoring at contact elements is hereby not possible in an indirect manner by measurement at components remote from the contact elements, e.g., a charging line, without making further effort. In a charging system, liquid cooling may be provided, e.g., at a charging line and also at assemblies of the plug connector part itself, which liquid cooling ensures cooling during operation, but does not thereby extend up to the contact lamellae of the contact elements, and thus does not provide direct cooling at the contact lamellae. A temperature measurement at cooled components, e.g., a charging line, does not permit a reliable statement about heating occurring under the conditions at the contact elements—in particular, the contact lamellae of a contact element.

There is thus a need for a plug connector part which enables a reliable temperature monitoring by measuring the temperature directly at those contact elements that carry load currents during operation, and at which heating may thus occur during operation.

It is here to be noted that the installation space in a plug connector part is usually limited—in particular, in the region of the contact elements—so that a sensor device for detecting the temperature shall have a low installation space requirement.

In an electrical contact element known from DE 10 2015 115 657 B3, an optical fiber is inserted into a groove on the contact element. The optical fiber is designed as a sensor and, for example, may serve for temperature measurement.

In a charging connector known from DE 10 2016 001 572 A1, a sensor is arranged on a connector adapter using heat shrink tubing.

WO 02/13330 A1 describes a plug connector which has contacts which are bushing-shaped or sleeve-shaped for receiving contact pins, wherein a temperature sensor is arranged at least at one of the contacts.

SUMMARY

In an embodiment, the present invention provides a plug connector part for charging an electrically-operated vehicle, comprising: at least one electrical contact element which is connectable along an insertion direction to a counter-contact element of a counter-plug connector part and has a plurality of contact lamellae grouped around a plug opening for receiving the counter-contact element; a spring element arranged at the contact lamellae, the spring element surrounding the contact lamellae circumferentially around the insertion direction, at least in portions, in order to provide a mechanical pre-tensioning, and a sensor device configured to detect a measurement variable, the sensor device being arranged at least at one of the contact lamellae and held by the spring element at the at least one of the contact lamellae.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

FIG. shows a partially cut-away side view of the plug connector part according to FIG. 2.

DETAILED DESCRIPTION

In an embodiment, the present invention provides a plug connector part for charging an electrically-operated vehicle, which plug connector part enables, in a structurally simple manner, a detection of a measurement variable—in particular, the temperature—at contact lamellae of a contact element, given efficient use of the available installation space.

Accordingly, the plug connector part has a sensor device for detecting a measurement variable, which sensor is arranged at least at one of the contact lamellae and is held by the spring element at the at least one of the contact lamellae.

The sensor device may in particular be designed to detect the temperature. The sensor device may, for example, have a sensor element in the form of a temperature-dependent resistor, so that a conclusion as to a temperature change at the contact lamellae may be drawn on the basis of a change in resistance.

The sensor device is arranged at least at one of the contact lamellae, and is thereby affixed to the contact lamellae via the spring element surrounding the contact lamellae. The spring element, also referred to as an overspring, serves, on the one hand, to provide an elastic pre-tensioning at the contact lamellae—in particular, to adjust, at the contact lamellae, in a state connected to an associated counter-contact element, a (sufficient) contact normal force between the contact lamellae and the counter-contact element, designed, for example, as a contact pin. On the other hand, the spring element serves as a fixation for the sensor device at the contact lamellae. Because the spring element, which is present anyway for providing the pre-tensioning force on the contact lamellae, is also used to affix the sensor device, the installation space required for the sensor device may be small, while reducing the parts count.

Because the sensor device is arranged directly at the contact lamellae, the sensor device may acquire a measurement variable—in particular, the temperature—directly at the contact lamellae and thus enable temperature monitoring at said contact lamellae. This makes it possible to detect any temperature increase at the contact lamellae essentially without delay and exactly, so that counter-measures may be introduced in the event of a failure—for example, because a charging process is interrupted or modified. In this way, a temperature monitoring is possible—in particular, in the region of contact points at which the contact lamellae electrically contact the associated counter-contact element.

The spring element thus serves to affix the sensor device to the contact lamellae. The sensor device may hereby abut against a single contact lamella. However, the sensor device may also abut against a plurality of contact lamellae at the same time.

In one embodiment, the spring element provides a pre-tensioning force directed radially inwards relative to the insertion direction, which pre-tensioning force acts upon the sensor device and thus presses the sensor device into abutment with the respectively associated contact lamella. Via the spring element, it is thus ensured that the sensor device bears against the associated contact lamella and thus may record a temperature at the associated contact lamella.

The spring element extending circumferentially around the contact lamellae of the contact element may, for example, have one or more windings and be formed from a spring wire, for example. The spring element may, for example, lie in a groove formed at the contact lamellae and circumferentially surrounding the contact lamellae in the insertion direction, and thereby encompass the contact lamellae in such a way that a pre-tensioning force, directed radially inwards, for adjusting a contact force is provided at the contact lamellae upon plug-in connection to an associated counter-contact element. The groove may, for example, be formed in the region of free ends of the contact lamellae. The contact lamellae may, for example, project along the insertion direction from a shaft segment of the contact element and carry the spring element at their free ends so that, in the region of the free ends, the spring element provides a pre-tensioning force directed radially inwards that counteracts an expansion of the contact lamellae.

In one embodiment, the spring element has a spring arm extending from the windings and a spring end adjoining the spring arm. The spring arm may, for example, extend along the insertion direction from the windings circumferentially wound around the contact lamellae, and carries at one end, remote from the windings, the spring end, which may, for example, be angled at approximately 90° in relation to the spring arm and acts upon the sensor device in order to affix the sensor device to the contact lamellae. The spring end may hereby, for example, be curved in order to act upon the sensor device and to exert a pre-tensioning force—in particular, a pre-tensioning force directed radially inwards—on the sensor device.

In one embodiment, one of the contact lamellae has a recess which extends longitudinally along the insertion direction and in which the spring arm lies. The recess forms a rotational safeguard for the spring element at the contact lamellae, and, in particular, has the effect that the spring arm cannot slip circumferentially, and thus the fixation of the sensor device is secured by the spring end arranged at the spring arm. The recess may, for example, be formed on the outside as a milled slot at one of the contact lamellae, wherein the recess may also be formed between two adjacent contact lamellae and thus may extend at the two adjacent contact lamellae.

In one embodiment, a receiving groove extending along the insertion direction, in which the sensor device lies, is formed at a contact lamella at which the sensor device is arranged. The receiving groove is formed on the outside of the associated contact lamella and receives the sensor device so that the sensor device is at least partially sunk into the associated contact lamella, and the installation space requirement additionally required for the sensor device is further reduced. Via accommodation in the receiving groove, the sensor device is additionally accommodated at a defined position at the associated contact lamella, and is secured, in particular, in the circumferential direction at the contact lamella, wherein, in particular, a radial securing of the sensor device also takes place via the spring element, and the sensor device is thus held at the contact lamella.

In one embodiment, the sensor device has a sensor element and an electrically-insulating housing enclosing the sensor element. The sensor element may, for example, be formed by a temperature-dependent resistor, wherein such a resistor may have a negative temperature coefficient (NTC resistor) or a positive temperature coefficient (PTC resistor). The housing encloses the sensor element and, for example, may be formed by a film tube with a small wall thickness—for example, with a wall thickness of between 0.01 mm and 0.1 mm. The housing is electrically insulating and, additionally, sufficiently voltage-resistant, so that even a large voltage applied to the contact element, e.g., up to 1,000 V, cannot lead to arcing to the sensor element. The housing is thermally conductive, so that heating occurring at the associated contact lamella can be recorded and detected via the sensor element.

In one embodiment, the sensor device has a supply line element which, for example, is formed by a flexible printed circuit board and on which the sensor element is arranged. The supply line element may have one or more leads for the sensor element, and is led out of the housing at one end in order to, for example, make electrical contact within the plug connector part with a superordinate electrical or electronic assembly, e.g., a signal contact, in order to thus enable temperature monitoring at the contact element.

The supply line element may, for example, extend in the form of a strip and carries the sensor element. The housing hereby encloses the sensor element and the supply line element, wherein the supply line element can be led out of the housing along the insertion direction in order to connect the sensor element to a superordinate electrical assembly.

In one embodiment, the sensor device has a support element that is likewise enclosed in the housing and arranged on a side, facing away from the sensor element, of the supply line element. The support element serves to mechanically stabilize the sensor device—in particular, in the region of the sensor element—in order to transmit a pre-tensioning force provided by the spring element to the sensor element and to effect a pre-tensioning at the sensor element radially, in the direction of the associated contact lamella.

In one embodiment, the contact element has a fixing element, e.g., in the form of an elastically-deformable ring element, e.g., an elastomer ring, which is arranged at the contact lamellae in such a way that the fixing element circumferentially surrounds the contact lamellae. The fixing element may serve to affix the supply line element to the contact lamellae and, for example, lies in an indentation formed on the contact lamellae and surrounding the insertion direction. The indentation is thereby formed, for example, at ends of the contact lamellae which face away from the free ends and at which the contact lamellae are connected, for example, to a solid shaft portion of the contact element.

The fixing element may effect a fixation of the supply line element, in that the fixing element surrounds the supply line element formed, for example, by a flexible printed circuit board, and thus holds it on the contact lamellae. The supply line element may, for example, have a curved portion which lies in the indentation formed on the contact lamellae and surrounding the insertion direction.

A plug connector part of the described type may, for example, realize a charging plug of a charging system for charging an electric vehicle. Such a plug connector part may, for example, be arranged on a charging cable and connected to a charging station via the charging cable. The plug connector part may, for example, be connected in a plug-in manner to an associated counter-plug connector part in the form of a charging socket on the side of an electric vehicle.

However, the plug connector part may also realize a charging socket—for example, on the side of an electric vehicle.

It is additionally conceivable and possible to use a plug connector part in another application for transmitting high currents in particular.

Figure 1:
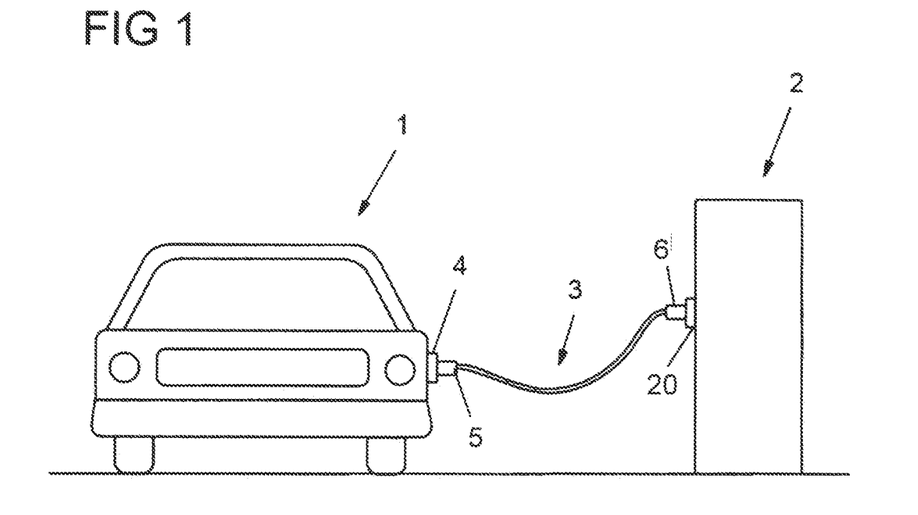
FIG. 1 shows a schematic representation of an electrically-operated vehicle (electric vehicle) with a charging cable and a charging station for charging.

FIG. 1 shows, in a schematic view, a vehicle 1 in the form of an electromotor-driven vehicle (also referred to as an electric vehicle). The electric vehicle 1 possesses electrically-chargeable batteries via which an electric motor for moving the vehicle 1 may be electrically supplied.

In order to charge the batteries of the vehicle 1, the vehicle 1 may be connected to a charging station 2 via a charging cable 3. For this purpose, the charging cable 3 may be plugged, with a plug connector part 5 in the form of a charging plug at one end, into an associated counter-plug connector part 4 in the form of a charging socket of the vehicle 1, and is connected at its other end to the charging station 2, e.g., in that another charging plug 6 is electrically connected to a counter-plug connector part 20 in the form of a charging socket at the charging station 2. Charging currents with a comparatively high amperage are transmitted to the vehicle 1 via the charging cable 3.

Figure 2:
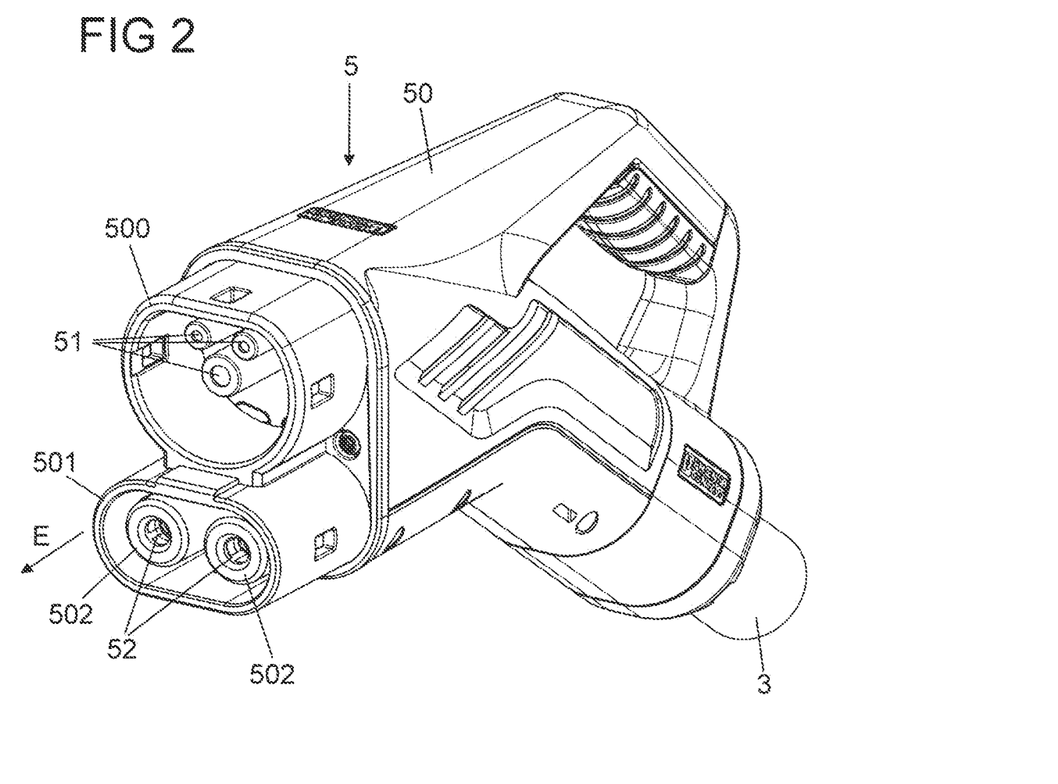
FIG. 2 shows a view of an exemplary embodiment of a plug connector part in the form of a charging plug for charging an electric vehicle.

FIG. 2 shows an exemplary embodiment of a plug connector part 5 that is arranged on a charging cable 3 and may, for example, be inserted into an associated counter-plug connector part 4 in the form of a charging socket on the side of a vehicle 1. The plug connector part 5 has a housing 50 with plug portions 500, 501 formed thereon, in the region of which are arranged contact elements 51, 52 for plug-in connection with associated counter-contact elements of the counter-plug connector part 4.

In the shown exemplary embodiment, contact elements 51 in the region of an upper plug portion 500 serve as signal contacts for transmitting control signals. By contrast, contact elements 52 at a lower plug portion 501 serve to transmit a charging current in the form of a direct current, in order to charge vehicle batteries of the vehicle 1.

Because load currents to be transmitted may have high amperages (for example, 500 A or even more), heating may occur at the different components of the charging system during operation of the charging system—for example, at the charging cable 3 and at the plug connector part 5. In order to counteract such heating, an active cooling may be provided, for example, on the charging cable 3 and at the plug connector part 5, e.g., in the form of a liquid cooling, which may absorb and dissipate heat at the charging cable 3 and at the plug connector part 5 so that excessive heating does not occur at the charging cable 3 and at the plug connector part 5.

Such a cooling may hereby extend up to the load contact elements 52, wherein, however, contact lamellae of the bushing-shaped contact elements 52 which lie in plug-in domes 502 within the lower plug portion 501 cannot be cooled directly.

However, during operation, heating may occur in particular at the contact elements 52. While, given normal operating conditions, an electrical resistance between the contact elements 52 of the plug connector part 5 and associated counter-contact elements of the counter-connector part 4 is usually low, such an electrical resistance may, for example, increase significantly in the event of fouling or damage to the contact elements 52 or the counter-contact elements, which may lead to drastically increased heating at the contact elements 52.

There is thus a need for temperature monitoring directly in the region of the contact lamellae of the contact elements 52, wherein the installation space provided in the region of the contact lamellae within the plug-in domes 502 is small, and thus only a small installation space is available for such temperature monitoring.

Figure 3:
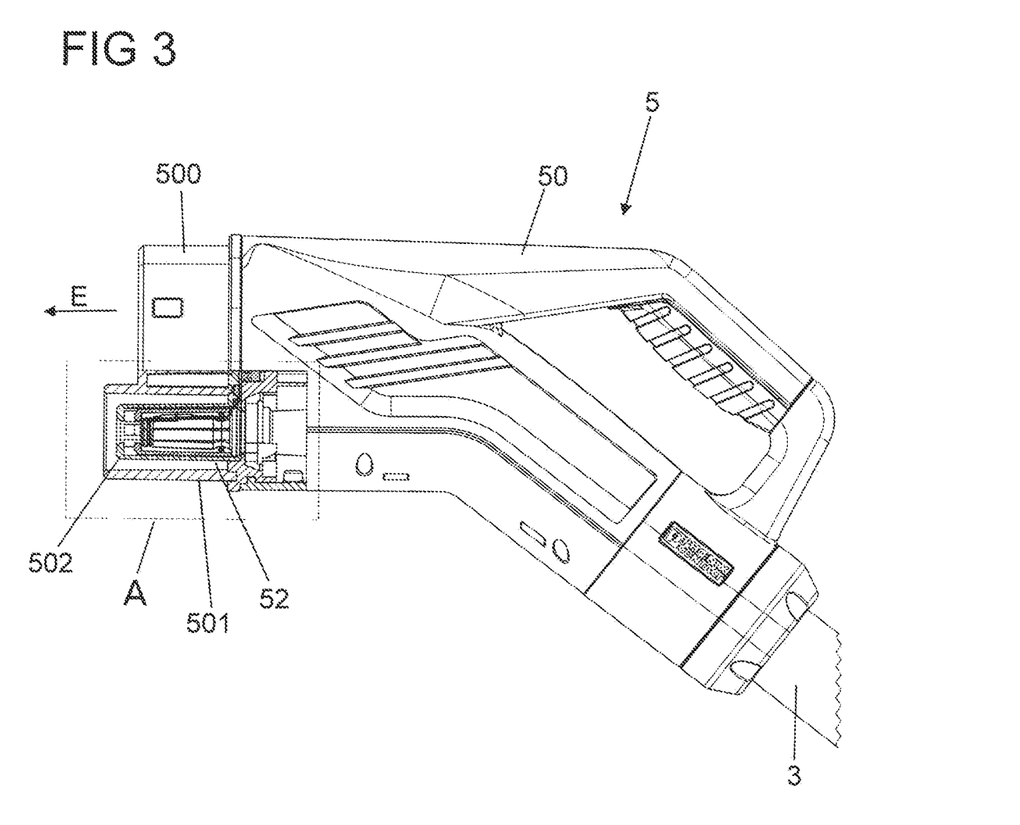
Figure 4:
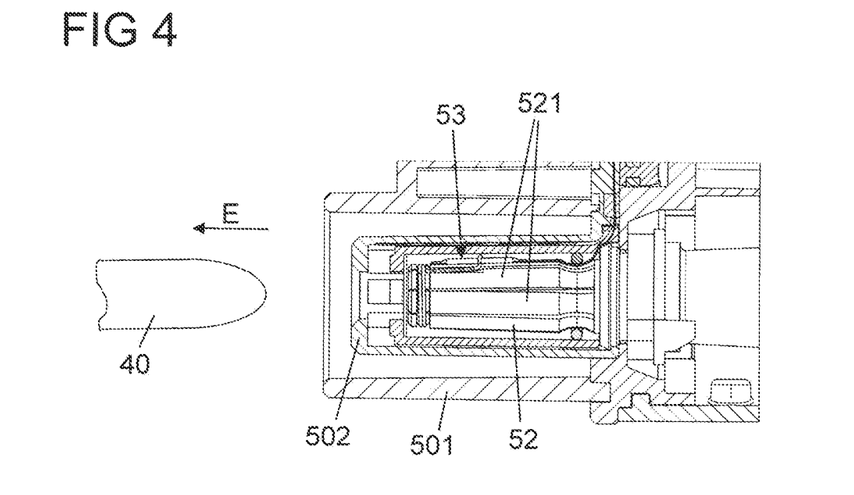
FIG. 4 shows an enlarged view in detail A according to FIG. 3.
Figure 5:
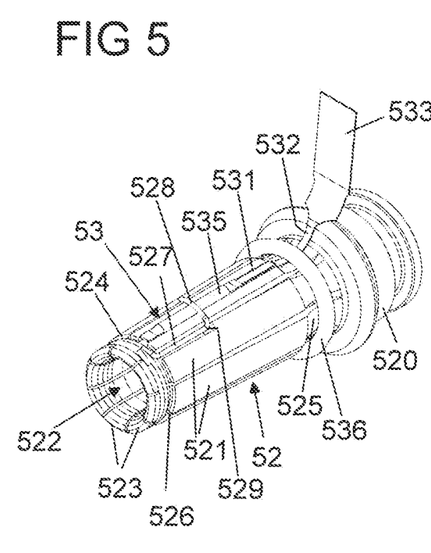
FIG. 5 shows a separate view of a contact element of the plug connector part, with a sensor device arranged on the contact element.
Figure 6:
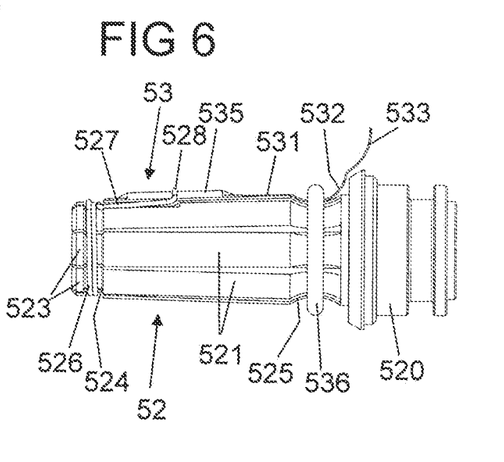
FIG. 6 shows a side view of the contact element.
Figure 7:
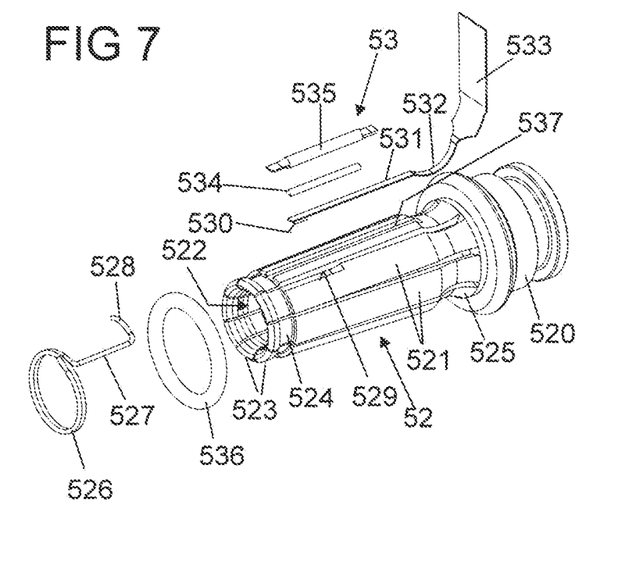
FIG. 7 shows an exploded view of the contact element.

As shown in the side view according to FIG. 3 and the enlarged sectional view according to FIG. 4, in conjunction with the separate views of a contact element 52 according to FIGS. 5 through 7, for one exemplary embodiment, it is apparent that the contact elements 52 with contact lamellae 521 extending from a shaft portion 520 are inserted into the respectively associated plug-in dome 502. Each contact element 52 may hereby be connected along an insertion direction E with an associated counter-contact element 40 in the form of a contact pin (see FIG. 4), in that the counter-contact element 40 in the form of the contact pin is inserted into a plug opening 522 formed by the contact lamellae 521 and thus is received within the plug opening 522.

The contact lamellae 521 extend along the insertion direction E from the cylindrical shaft portion 520, wherein adjacent contact lamellae 521 are separated from one another by a respective slot. In a plugged-in state, the contact lamellae 521 contact the counter-contact element 40, wherein the contact lamellae 521 can be at least slightly elastically deflected and, in the plugged-in state, bear against the counter-contact element 40 with an elastic pre-tensioning (the contact normal force).

In order to provide, in the inserted state, a defined contact normal force for the contact between the contact lamellae 521 and the counter-contact element 40 designed as a contact pin, a spring element 526 is arranged in the region of free ends 523 of the contact lamellae 521 that are remote from the shaft portion 520, which spring element 526 is made from a wound spring wire and surrounds the contact lamellae 521 on the outside along a circumferential direction directed around the insertion direction E, as is shown in FIGS. 5 and 6, for example.

The spring element 526, also referred to as an overspring, has, for example, more than one winding, e.g., approximately two windings, and lies in a groove 524 formed at the contact lamellae 521 and surrounding the insertion direction E, and is held axially thereabove on the contact lamellae 521. The spring element 526 provides a pre-tensioning force directed radially inwards on the contact lamellae 521, and thereby elastically and resiliently counteracts an expansion of the contact lamellae 521 so that it is ensured, via the spring element 526, that the contact lamellae 521 bear against an inserted counter-contact element 40 with sufficient pre-tensioning force.

In the exemplary embodiment shown in the figures, arranged at the contact element 52 is a sensor device 53 that is designed to detect a measurement variable at the contact lamellae 521—in particular, to detect the temperature.

In the shown exemplary embodiment, the sensor device 53 has a sensor element 530, e.g., in the form of a temperature-dependent resistor, which is arranged at a supply line element 531, e.g., in the form of a flexible printed circuit board, and enclosed together with a support element 534 in a housing 535.

Figures 8, 9:
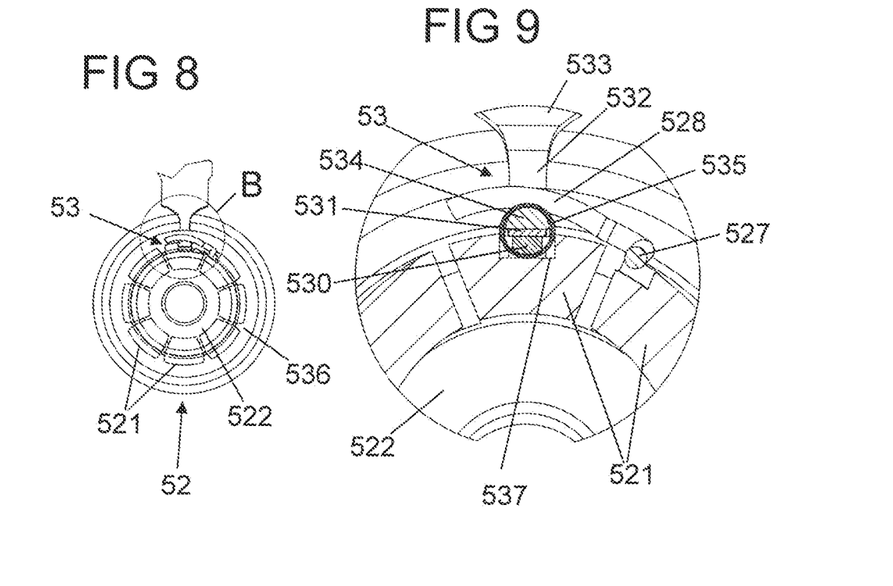
FIG. 8 shows a front view of the contact element.
FIG. 9 shows an enlarged view in detail B according to FIG. 8.

As is apparent from FIGS. 8 and 9, the sensor element 530 is arranged on a side, facing towards the associated contact lamella 521 of the supply line element 531. By contrast, the support element 534 is located on a side, facing away from the contact lamella 521, of the supply line element 531 and serves to mechanically stabilize the sensor device 53.

The housing 535 circumferentially encloses the sensor element 530, the supply line element 531, and the support element 534, and is formed, for example, by a film tube of small wall thickness—for example, a few hundredths of a millimeter. The housing 535 is hereby electrically insulating and sufficiently voltage-resistant so that even large voltages applied to the contact element 52 cannot lead to an arcing at the sensor element 530 within the housing 535.

The housing 535 is closed circumferentially and also at its ends, so that the sensor element 530 is enclosed within the housing 535 in a moisture-tight manner.

The supply line element 531, formed, for example, in the form of strips by a flexible printed circuit board, is led out of the housing 535 at one end, as is apparent in particular from FIGS. 5 and 6, and is thereby sealed with respect to the housing 535 in such a way that moisture cannot enter into the interior of the housing 535. The supply line element 531 is inserted with a curved portion 532 into an indentation 525, which is formed at the contact lamellae 521 in the region of ends facing towards the shaft portion 520 and circumferentially surrounds the insertion direction E, and opens into a connector portion 533 via which the sensor device 53 may be connected to a superordinate electrical or electronic assembly, e.g., a signal contact 51, for the purpose of monitoring the temperature.

Figure 13:
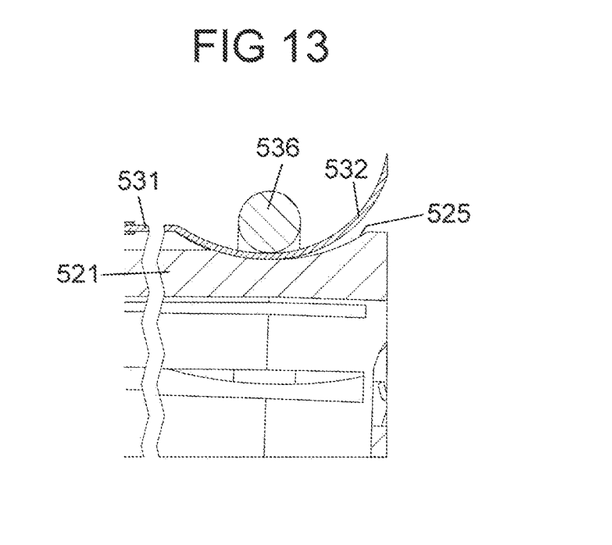
FIG. 13 shows a sectional view of a fixing element arranged on the contact lamellae for affixing a supply line element.

As is apparent from FIGS. 5 through 7 in conjunction with FIG. 13, a fixing element 536 extends around the contact lamellae 521 in the region of the indentation 525. In the shown exemplary embodiment, the fixing element 536 is formed by an elastomer ring and serves to act upon the curved portion 532 of the supply line element 531, and thereby affix said supply line element 531 at the contact lamellae 521.

Figure 10:
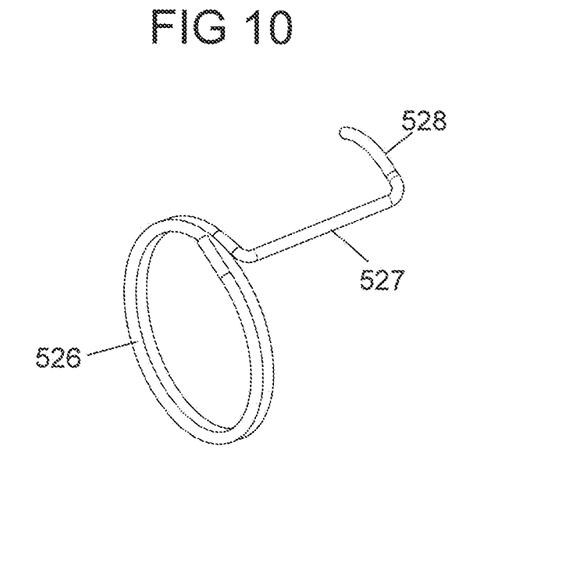
FIG. 10 shows a separate view of a spring element that is arranged on contact lamellae of the contact element.
Figure 11:
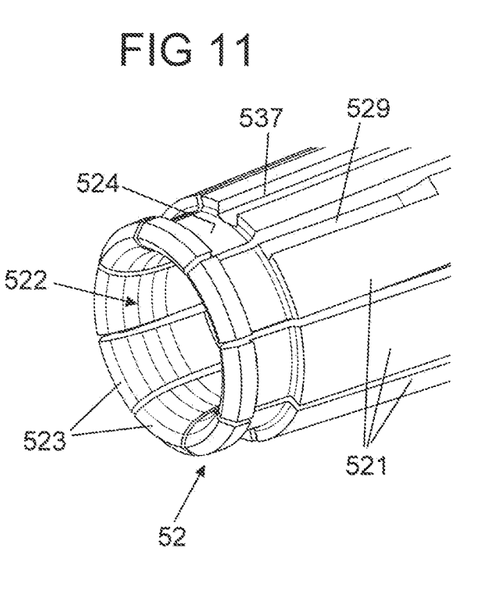
FIG. 11 shows an enlarged view of the contact element in the region of free ends of the contact lamellae, without a spring element arranged on the contact lamellae.
Figure 12:
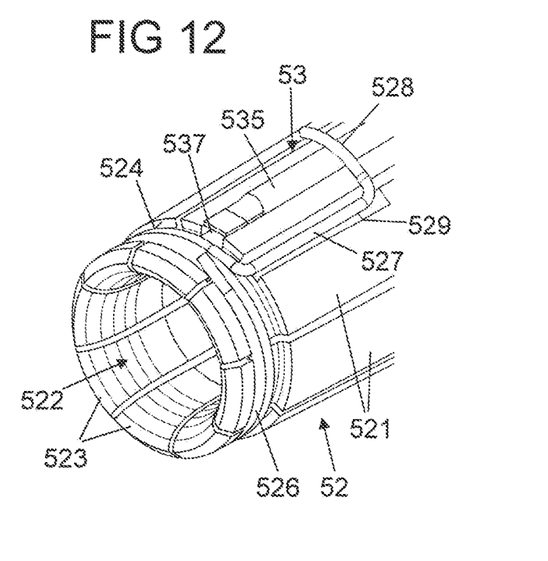
FIG. 12 shows a view of the contact lamellae in the region of their free ends, with a spring element arranged on the contact lamellae and a sensor device.

The sensor device 53 rests in a receiving groove 537 formed on one of the contact lamellae 521, extending along the insertion direction E on the outside of the associated contact lamella 521, and is affixed in the receiving groove 537 via the spring element 526 and held above it on the contact element 52. As is apparent from FIGS. 10 and 12, the spring element 526 has a spring arm 527 projecting axially along the insertion direction E from the windings of the spring element 526, which spring arm 527 bears a curved spring end 528 remote from the windings and angled with respect to the spring arm 524. As is apparent from FIG. 11 in conjunction with FIG. 12, in the installed position (FIG. 12), the spring arm 527 is placed in a recess 529 formed at one of the contact lamellae 521 and, with the spring end 528, overlaps the sensor device 53 situated in the receiving groove 537 of the associated contact lamella 521, so that the sensor device 53 is affixed at the associated contact lamella 521 via the spring element 528. Because the spring arm 527 lies in the recess 529, the spring element 526 is circumferentially secured against rotation so that, in particular, the spring arm 527 cannot slip in the circumferential direction, and the spring end 528 cannot disengage from the sensor device 53.

Because the spring end 528 surrounds the sensor device 53 on the outside and acts radially upon said sensor device 53, the spring element 526, together with the spring end 528 arranged at the spring arm 527, presses the sensor device 53 elastically into abutment with the associated contact lamella 521. In this way, as is apparent in particular from the enlarged view according to FIG. 9, placement of the (thermally-conductive) housing 535 on the associated contact lamella 521 is effected, and the sensor element 530 is brought into thermal connection with the contact lamella 521.

The sensor device 53 is thus affixed to the contact lamellae 521 by the spring element 526 (additionally serving to pre-tension the contact lamellae 521). In the case of deflection of the contact lamellae 521 during plug-in connection to a counter-contact element 40, the sensor device 53 may thereby also spring along together, unimpeded by the spring arm 527 and the spring end 528 arranged thereon.

Because the sensor device 53 is inserted at the contact lamella 521 at an associated receiving groove 537 and, in addition, a component which is already present, viz., the spring element 526, is used to affix the sensor device 53 at the contact lamella 521, the installation space requirement due to the sensor device 53 in the region of the contact lamellae 521 hardly increases. The sensor device 53 thus does not collide with the plug-in dome 502 receiving the contact lamellae 521 (see FIGS. 3 and 4), so that, during operation, temperature monitoring may be performed directly at the contact lamellae 521.

The idea forming the basis of the invention is not limited to the exemplary embodiments described above; rather, it can also be implemented in other ways.

A sensor device may be arranged according to the described manner at one or more contact elements of a plug connector part. A sensor device according to the described type may, advantageously, be arranged at, in particular, each contact element which serves to transmit load currents during operation.

A sensor device may serve to detect the temperature, wherein the sensor device has a sensor element, e.g., in the form of a temperature-dependent resistor, and thus generates a measurement signal or contributes at least to generating a measurement signal. In principle, however, other measurement variables may also be recorded.

A plug connector part of the described type may, advantageously, be used for charging an electric vehicle, wherein other applications are also conceivable and possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Vehicle
2 Charging station
20 Counter-plug connector part (charging socket)
3 Charging cable
4 Counter-plug connector part (charging socket)
40 Counter-contact element
5, 6 Plug connector part (charging plug)
50 Housing
500, 501 Plug portion
502 Plug-in domes
51 Contact element (signal contact)
52 Contact element (load contact)
520 Shaft portion
521 Contact lamellae
522 Plug opening
523 Ends
524 Groove
525 Indentation
526 Spring element (overspring)
527 Spring arm
528 End
529 Recess
53 Sensor device
530 Sensor element
531 Supply line element
532 Curved portion
533 Connector portion
534 Support element
535 Housing
536 Fixing element
537 Receiving groove
E Insertion direction

The invention claimed is:

1. A plug connector part for charging an electrically-operated vehicle, comprising: at least one electrical contact element which is connectable along an insertion direction to a counter-contact element of a counter-plug connector part and has a plurality of contact lamellae grouped around a plug opening for receiving the counter-contact element; a spring element arranged at the contact lamellae, the spring element surrounding the contact lamellae circumferentially around the insertion direction, at least in portions, in order to provide a mechanical pre-tensioning, and a sensor device configured to detect a measurement variable, the sensor device being arranged at least at one of the contact lamellae and held by the spring element at the at least one of the contact lamellae.

2. The plug connector part according to claim 1, wherein the spring element exerts a pre-tensioning force, directed radially inwards relative to the insertion direction, on the sensor device.

3. The plug connector part according to claim 1, wherein the spring element lies in a groove formed at the contact lamellae and circumferentially surrounding the contact lamellae.

4. The plug connector part according to claim 1, wherein the spring element has at least one winding which is circumferentially wound around the contact lamellae.

5. The plug connector part according to claim 4, wherein the spring element has a spring arm extending from the at least one winding and a spring end adjoining the spring arm, wherein the spring end acts upon the sensor device.

6. The plug connector part according to claim 5, wherein the spring arm lies in a recess formed at one of the contact lamellae and extending longitudinally along the insertion direction.

7. The plug connector part according to claim 1, wherein a receiving groove in which the sensor device lies is formed at the at least one of the contact lamellae and extends longitudinally along the insertion direction.

8. The plug connector part according to claim 1, wherein that the sensor device has a sensor element and an electrically-insulating housing enclosing the sensor element.

9. The plug connector part according to claim 8, wherein the housing is formed by a film tube.

10. The plug connector part according to claim 8, wherein the sensor device has a supply line element at which the sensor element is arranged and which is led out of the housing along the insertion direction.

11. The plug connector part according to claim 10, wherein the supply line element is formed by a flexible printed circuit board.

12. The plug connector part according to claim 10, wherein the sensor device has a support element that is enclosed in the housing and is arranged on a side, facing away from the sensor element, of the supply line element.

13. The plug connector part according claim 10, wherein a fixing element which is arranged at the at least one contact element, surrounds the contact lamellae, and affixes the supply line element at the contact lamellae.

14. The plug connector part according to claim 10, wherein the supply line element has a curved portion which lies in an indentation formed on the contact lamellae and surrounding the insertion direction.

\* \* \* \* \*